Patented Sept. 13, 1932

1,877,237

UNITED STATES PATENT OFFICE

EDWIN B. HART, OF MADISON, WISCONSIN, ASSIGNOR TO WISCONSIN ALUMNI RESEARCH FOUNDATION, OF MADISON, WISCONSIN, A CORPORATION OF WISCONSIN

COMPOUND FOR THE PREVENTION AND TREATMENT OF ANEMIA

No Drawing. Application filed June 18, 1928. Serial No. 286,497.

This invenion relates to a compound for the prevention and treatment of anemia.

Anemia in one form is a disease of human infants and adults, and of young animals which is likely to develop from living solely on a milk diet over too long a period. It is also a disease of mature animal life. It is characterized by a deterioration of the blood stream with respect to its content of hemoglobin and the number of red blood cells. As the disease develops the respiration becomes rapid, the heart enlarged, the pleural cavity edematous, and death follows, unless remedies are provided.

The invention is broadly directed and has for its object the specific prevention or beneficial treatment or corrective of anemia however induced, and contemplates the use of a therapeutic agent containing as an active ingredient salts of the elements copper and iron, which may be administered either together or in conjunction with other substances hereinafter referred to, by direct feeding to the patient or through the addition of the salts of copper and iron to the diet, whereby the hemoglobin content of the blood and the number of red blood cells are beneficially affected and anemia corrected or prevented.

The invention further contempates the provision of a therapeutic agent containing salts of both the elements copper and iron, administered as above referred to, and wherein the salts of the elements copper and iron appear to be made available in the blood stream of the patient for the purpose of increasing the hemoglobin content of the blood and the number of red blood cells. In particular, the invention relates to the use of simple salts of iron, such for instance as iron chloride, and inorganic salts of copper, such for instance as copper sulphate. However, other salts of the elements mentioned may be employed, such as copper acetate, copper chloride, or any other convenient salt, and even metallic copper has been used. The iron is equally necessary, and it is the presence of the copper which makes the iron effective in hemoglobin building. Consequently, both iron and copper must be present, and in making effective anemia-preventing food mixtures, both iron salts and copper salts (or metallic copper) are to be added. The iron also can be used as a sulphate, a citrate, or a phosphate, or other salt iron, and it has even been found that in some cases the mere use of commercial inorganic iron salts may be effective in the treatment of anemia in virtue of their content of copper as a contaminant, although commercial iron salts in which copper is not present are not effective.

Further, the invention contemplates a therapeutic agent for the treatment of anemia wherein the salts of the element copper are adminstered to patients, in combination with the salts of iron, and wherein the salts of the elements copper and iron are made available from the ash of dry plant tissue, such as lettuce, cabbage, alfalfa, and the stem and leafy parts of other plants; from the seeds of plants, as for example, corn grain; or from animal tissue, such as liver, spleen, bone marrow, egg yolk, and other animal tissue.

Further, the invention contemplates a therapeutic agent of the character referred whereby inorganic substances such as salts of the elements copper and iron, either singly or in combination, are made available for assimilation or beneficient co-action with reference to the blood stream of the patient, when the substance is directly fed to the patient or added to the diet, and wherein the salt of the element copper is procured by burning such plant and animal tissues as above mentioned, and removing the carbon therefrom, leaving an ash residue containing salts of the element copper, and of iron, and possibly other substances not yet identified.

The invention further contemplates administering to a patient an ash prepared from plant or animal tissue as before referred to, either by direct feeding or addition to the diet of the patient, which ash has been rid of carbon and contains salts of copper, and of iron.

In carrying out the invention, dried plant tissue, such as lettuce, cabbage, alfalfa, or the stem and leafy parts of other plants, and the seeds of certain plants, as for example, corn grain; or animal tissue such as liver, spleen, bone marrow, egg yolk, and other tissues, are treated as follows:—First, the ash of the plant and animal tissue may be prepared by incinerating the material at a temperature that destroys the carbon of the plant or animal tissue. The temperature at which this ash should be prepared from vegetable or animal tissue is what is called a low cherry red, that is, a temperature of from 550° to 650° C., or thereabouts. After the ash is prepared, it may, if desired, be used directly as an addition to the diet, but if further treatment is desired in order to secure the active constituents, a suitable solvent may be employed, as for instance a forty percent (40%) solution of hydrochloric acid, which acid is added to the ash and the mixture digested at from 60° to 70° C., and then filtered through filter paper. The filtrate contains the active substances, which consist of small portions of salts of the elements copper and iron, and the hydrochloric acid of the solution is removed by evaporation and heating to dryness. After evaporation of the hydrochloric acid the residue is suitable for feeding or can be dissolved in water and used.

An ash of the character referred to has been utilized in connection with the correction and prevention of anemia with surprising results. For instance, the ash of 1 gm. of dried lettuce per day, added to whole milk, utilized as the only other source of food, maintained the blood stream of a 200 gm. rat at a normal level with respect to hemoglobin and blood count for an indefinite period. Without the ash the disease of anemia would set in, with deterioration of the blood stream, followed by death.

Salts of the element iron have long been considered by physicians and chemists to be useful in the treatment of anemia, and it was known that a certain proportion of iron was present in the residue ash, after burning the plant and animal tissues above referred to. One would assume that the administration of the ash to a patient merely supplied him with the necessary iron to combat an anemic condition. However, extensive experiments showed that the administration of pure inorganic iron in any form to an anemic patient, failed to serve in augmenting the depleted hemoglobin content and number of red blood cells of the blood stream. This unexpected result led to further examination of the ash of liver and lettuce, for instance, as well as the ash of the other materials heretofore referred to, which in each instance disclosed that the ash possessed a pale bluish color similar in hue to that produced by copper compounds when burned. Assuming the presence of copper salts in the ash, and considering the efficacy of the ash in counteracting the anemic condition, copper compounds, such as copper sulphate were administered to the anemic animals through direct feeding or additions to the diet. Surprising cures were effected. Rats suffering with advanced attacks of anemia and with their hemoglobin reduced more than 75%, were restored to normal by daily additions to their milk diet of various quantities of copper in the form of pure copper sulphate.

Subsequent experiments were conducted wherein the salts of copper and iron were administered together, which experiments again demonstrated the active properties of the agent in correcting and preventing anemia. As above stated, iron salts alone appeared to have no effect in checking or preventing the disease, though it is believed that possibly the iron is made available in its effect on the blood stream, in some way not yet determined when administered in conjunction with salts of copper.

Further experiments showed that salts of copper in conjunction with plant and animal tissues heretofore used in connection with the treatment of anemia produced marked and beneficial changes in the blood steam; also salts of copper in addition to the ash of plant and animal tissue, as above referred to, produced marked beneficial effects; and the same was found to be true of combinations of salts of copper and extracts of plant and animal tissues, such as lettuce, corn and dried liver. Also the presence of salts of copper and iron in conjunction with the plant and animal tissues, or the ash of plant and animal tissues, or extracts thereof, also produced marked beneficial results in the treatment of anemia.

In each instance, the therapeutic agent or compound was fed directly to animals or added to the diet of the same, and the experiments conclusively demonstrated that administration of inorganic substances, particularly salts of copper, in conjunction with salts of iron, or as additions to plant or animal tissue containing salts of iron, or the extracts of such plant or animal tissue, or the ash of such plant or animal tissue, or the ash of extracts of such plant or animal tissue, is decidedly efficacious in increasing the hemoglobin content of blood as well as the number of red blood cells, when anemia is present, and further prevents a reduction of the hemoglobin content or number of red blood cells such as would produce anemia without the use of the therapeutic agent in one of its various forms.

The process of administering the agent in its various forms by introduction into the stomach indicates a chemical reaction with the blood of the animal whereby the therapeutic agent in its various forms is made available for the purpose of materially increasing the hemoglobin content of the blood and the number of red cells thereof, resulting in the positive correction and prevention of anemia by improving the condition of the blood stream and maintaining it in such condition as to eliminate the known causes which produce anemia. In order to point out more in detail the precise manner in which the material may be prepared, and without limiting myself to the particular details hereinafter set forth, the following is given as an example of a technique which may be successfully employed:

The dried plant material such as lettuce, cabbage, alfalfa, etc.; or the stem and leafy parts of other plants; or seeds of plants such as corn, grain; or animal tissue such as liver, spleen, bone marrow, egg yolk, and other animal tissues, is placed in a porcelain dish, and this dish with its contents then placed in a suitable furnace either gas or electric heated, or fired in any other suitable way, and subjected to an ashing temperature of 550 to 650° C. for a time sufficient to completely char this mass and burn off the carbon. This may require one or two hours, and leaves a gray ash which can be then used as a supplement to the diet or ration as sources of iron and copper. One or two grams of such ash daily becomes a corrective for anemia induced by milk diets. Larger amounts would be used where the adult is involved in some type of secondary anemia.

Further work discloses that the constituents of the ash that are active in preventing the anemia are iron and copper salts. These are best used in the form of iron chloride and copper sulfate. A proportion of iron chloride contributing 25 mgs. of iron daily and a proportion of copper sulfate contributing 4 mgs. of copper daily is the daily dosage for an adult; for an infant, the same amount of iron but an amount of copper sulfate contributing 1 mg. of copper daily. These two salts, iron chloride and copper sulfate, can be mixed directly by trituration in a mortar and then compounded with some inert material like milk powder or corn starch to insure palatability; or they can be dissolved in water and then mixed with some sugar syrup to make them more palatable.

While I have herein shown and described what I consider the preferred manner of carrying out the invention, the same is merely illustrative, and I contemplate all changes and modifications which come within the scope of the claims appended hereto.

What I claim is:

1. A therapeutic agent for use in connection with the treatment of anemia, including copper sulphate and a salt of iron combined to render effective the utilization of said salts for correcting the anemic condition of the blood.

2. A therapeutic agent for use in connection with the treatment of anemia, in the form of an ash derived from organic material containing salts of iron and copper combined to activate hemoglobin regeneration of the blood.

3. A therapeutic agent for use in connection with the treatment of anemia, in the form of an ash derived from organic material containing a salt of iron and copper sulphate combined to activate the hemoglobin regeneration of the blood.

4. A therapeutic agent for the treatment of anemia containing salts of the elements of iron and copper combined to render effective the utilization of the iron to correct the anemic condition of the blood.

5. A therapeutic agent for the treatment of anemia containing salts of the elements of iron and copper combined to render effective the utilization of said salts to correct the anemic condition of the blood.

6. A therapeutic agent for the treatment of anemia containing salts of the elements of iron and copper combined to render effective the utilization of said salts for increasing the hemoglobin content of the blood.

In witness that I claim the foregoing I have hereunto subscribed my name this 12th day of June, 1928.

E. B. HART.